W. W. TALBOT.
NON-SKID ARMOR FOR WHEEL TIRES.
APPLICATION FILED MAY 12, 1917.
1,273,688.
Patented July 23, 1918.
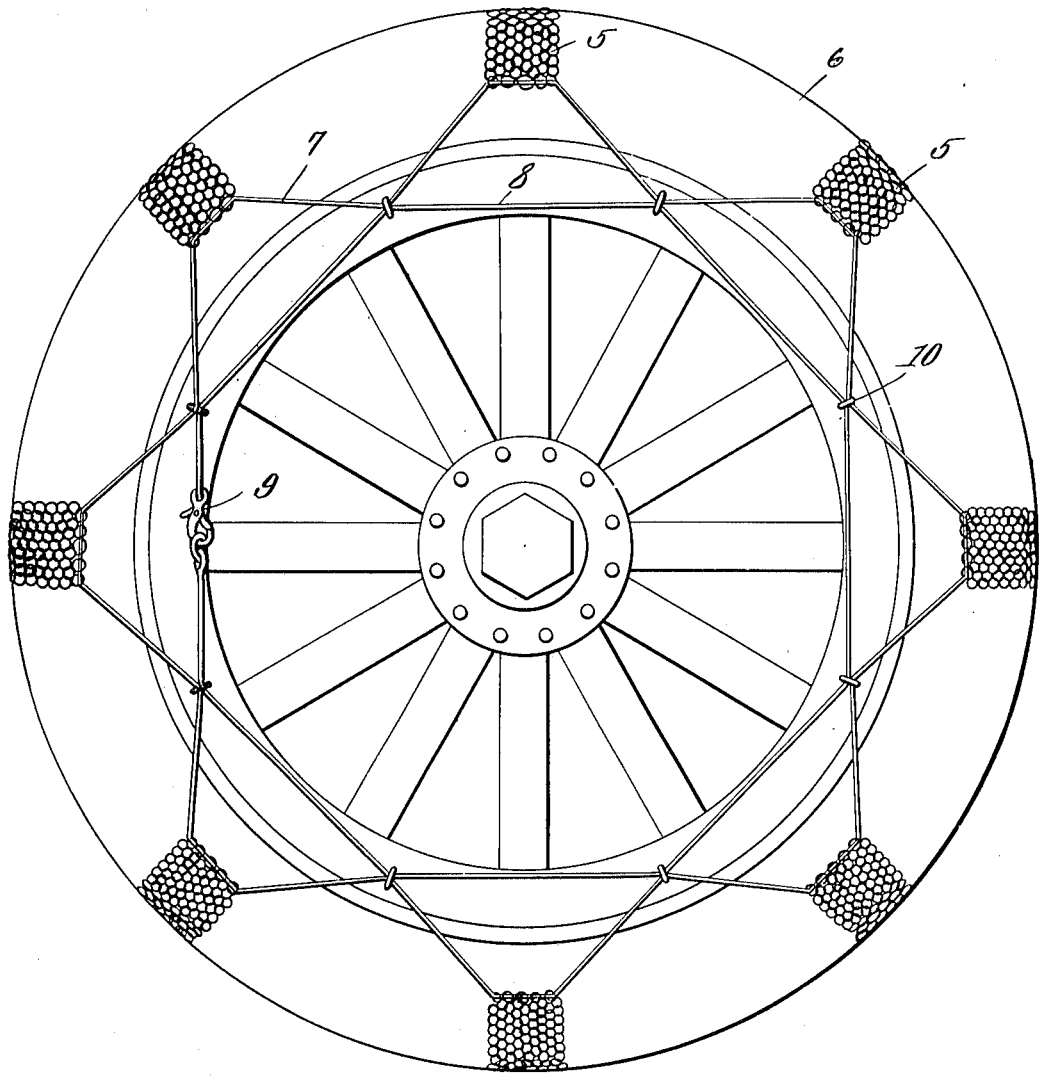
Inventor
William W. Talbot.
By Henry J. Bruington,
Attorney

UNITED STATES PATENT OFFICE.

WILLIAM W. TALBOT, OF NEW YORK, N. Y., ASSIGNOR OF ONE-HALF TO ANDREW-TRUST POEHLMANN, OF BALTIMORE, MARYLAND.

NON-SKID ARMOR FOR WHEEL-TIRES.

1,273,688.      Specification of Letters Patent.      Patented July 23, 1918.

Application filed May 12, 1917. Serial No. 168,071.

*To all whom it may concern:*

Be it known that I, WILLIAM W. TALBOT, a citizen of the United States, residing at New York city, borough of Manhattan, in the county of New York and State of New York, have invented certain new and useful Improvements in Non-Skid Armor for Wheel-Tires, of which the following is a specification.

This invention relates to attachments to vehicle tires designed to prevent skidding on slippery pavements or roadways.

The invention has for its object to provide a simple and efficient device of the kind stated, and one which can be easily attached to or removed from the tire.

The object stated is attained by means of a novel combination and arrangement of parts to be hereinafter described and claimed, and in order that the same may be better understood, reference is had to the accompanying drawing forming a part of this specification.

The drawing shows a side elevation of a wheel equipped with the anti-skidding device which is the subject matter of the present application for patent.

Referring specifically to the drawing, the anti-skidding device consists of a series of metallic mats 5 extending across the tread of the tire 6, on the outside thereof from one side to the other, and anchored to the wheel by a means to be presently described. A suitable number of these mats are provided, so that a firm grip is obtained on slippery pavements or roadways. As clearly shown in the drawing, the mats are each composed of small metallic rings linked together to for a flexible band which readily adapts itself to the cross-sectional contour of the tire, and the manner of connecting the rings to produce the band gives the latter the required surface roughness for the purpose stated.

For holding the mats 5 in place on the tire 6, the following means are provided:

A flexible member 7, which may be a wire or cable, connects the series of mats 5 on each side of the tire 6, and a second flexible member 8 draws the former tightly to the tire, said member 8 having its ends separately connected by a snap hook or any other suitable coupling device 9. The member 7 can be easily connected to the mats 5 by being passed through the end rings thereof, as shown in the drawing.

The member 8 is located inside the member 7 and follows the same around the tire. The portions of the member 7 which lie between the mats 5 are loosely connected to the member 8, the connections being conveniently made by rings 10 through which said members 7 and 8 pass.

The arrangement of the member 7 is such that its portions which extend between the mats 5 are longer than the spaces between the latter when they are properly positioned on the tire 6, in view of which it will be seen that said intermediate portions are slack before the member 8 is tightened up and when the latter is tightened up by connecting its ends, the said intermediate portions are drawn inwardly to take out the slack therein, and the device is now securely anchored on the tire in proper position for service. When the device is to be taken off the tire, the member 8 must be separated, which reduces the tension on the member 7 and leaves it sufficiently loose so that the entire device can be easily slipped off the tire. It will be understood of course, that the length of the member 8 is such that when it is connected at its ends it tightens up the member 7 as described. The device can be easily put on and taken off, and it is also simple and inexpensive, the use of chains and similar expensive members being dispensed with.

I claim:

In combination, with a wheel having a tire, a circumferential series of members engaging the tread of said tire, a series of flexible members connected at opposite sides of said tire, to the corners of the several members, and providing endless cables of a greater diameter than said tire, a ring linked upon each of said flexible members, and a cable arranged on each side of said tire and passing through all of said rings on one side of the tire, and adapted to have its opposite ends drawn taut and secured together so as to bow all of said flexible members and provide flexible portions of its own length forming angles with the several pairs of said flexible members whereby it will be adapted to form a polygonal outline.

In testimony whereof I affix my signature in the presence of two witnesses.

WILLIAM W. TALBOT.

Witnesses:
E. WALTON BREWINGTON,
HOWARD D. ADAMS.